(12) United States Patent
Awad

(10) Patent No.: US 8,620,218 B2
(45) Date of Patent: Dec. 31, 2013

(54) POWER HARVESTING AND USE IN A NEAR FIELD COMMUNICATIONS (NFC) DEVICE

(75) Inventor: Mohamed Awad, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 265 days.

(21) Appl. No.: 13/172,335

(22) Filed: Jun. 29, 2011

(65) Prior Publication Data

US 2013/0005247 A1    Jan. 3, 2013

(51) Int. Cl.
*H04B 5/00* (2006.01)
(52) U.S. Cl.
USPC ... 455/41.2; 455/41.1; 455/550.1; 455/422.1; 455/556.1; 455/426.1; 455/575.7; 455/456.1; 340/5.61; 340/10.1; 340/3.1; 340/572.1; 340/505; 340/10.5; 340/5.92; 340/540
(58) Field of Classification Search
USPC .............. 455/41.1, 41.2, 550.1, 422.1, 556.1, 455/426.1, 562.1, 575.7, 456.1; 340/5.61, 340/10.1, 3.1, 572.1, 505, 572.7, 10.5, 5.92, 340/540
See application file for complete search history.

(56) References Cited

U.S. PATENT DOCUMENTS

| 2007/0245057 | A1* | 10/2007 | Bohm et al. | 710/313 |
|---|---|---|---|---|
| 2007/0287498 | A1* | 12/2007 | Wang et al. | 455/556.1 |
| 2007/0293261 | A1* | 12/2007 | Chung | 455/550.1 |
| 2008/0272889 | A1* | 11/2008 | Symons | 340/10.1 |
| 2009/0088077 | A1* | 4/2009 | Brown et al. | 455/41.2 |
| 2009/0131036 | A1* | 5/2009 | Liang et al. | 455/422.1 |
| 2009/0243832 | A1 | 10/2009 | Hyde et al. | |
| 2010/0039234 | A1* | 2/2010 | Soliven et al. | 340/10.1 |
| 2010/0167648 | A1* | 7/2010 | Doutriaux | 455/41.2 |

FOREIGN PATENT DOCUMENTS

| EP | 2 073 176 A1 | 6/2009 |
|---|---|---|
| WO | WO 2009002064 A1 | 2/2009 |

OTHER PUBLICATIONS

European Search Report for EP Patent Application No. EP 12004738.6, European Patent Office, Munich, Germany, mailed on Oct. 25, 2012.
English Abstract for European Patent Publication No. EP 2 073 176 A1, published Jun. 24, 2009, downloaded from http://worldwide.espacenet.com/, 1 page.

* cited by examiner

*Primary Examiner* — Ping Hsieh
*Assistant Examiner* — Ganiyu A Hanidu
(74) *Attorney, Agent, or Firm* — Sterne, Kessler, Goldstein & Fox P.L.L.C.

(57) ABSTRACT

Apparatus for harvesting and using power in a near field communications mode, includes a host device with operating components. A first near field communication (NFC) device is contained in the host device and is configured to be selectively coupled to one of the operating components. The first NFC device harvests energy from a second NFC device and converts the harvested energy to electrical power. The first NFC device receives information from the second NFC device and power on the operating component as a function of the information received from the second NFC device. The first NFC device transfers data to or from the operating component when the operating component is powered on. The first NFC device powers off the operating component when the transfer of data between the first NFC device and the operating component has been completed.

18 Claims, 6 Drawing Sheets

POWER HARVESTING AND USE IN A NEAR FIELD COMMUNICATIONS (NFC) DEVICE

BACKGROUND

1. Field of the Invention

The present invention relates generally to near field communications.

2. Background Art

Near field communication, or NFC, is a set of short-range wireless technologies, typically requiring a distance of 4 cm or less. NFC generally operates at 13.56 MHz and at rates ranging from about 106 kbit/s to 848 kbit/s. NFC always involves a reader (or initiator) and a tag (or target); the reader actively generates an RF field that can power a passive tag. This enables NFC tags to be configured so as to have very simple form factors such as tags, stickers, key fobs, or cards that do not require batteries. NFC peer-to-peer communication is of course possible, where both devices are powered. Devices that contain both reader and tag capabilities are called controllers.

Near field communications (NFC) devices can be integrated into mobile devices, such as smartphones, for example, to facilitate the use of these mobile devices in conducting daily transactions. For example, instead of carrying numerous credit cards, the credit information provided by these credit cards could be stored onto a NFC device. The NFC device is simply tapped to a credit card terminal to relay the credit information to it to complete a transaction. As another example, ticket writing systems, such as those used in bus and train terminals, may simply write ticket fare information onto the NFC device instead of providing a ticket to a passenger. The passenger simply taps the NFC device to a reader to ride the bus or the train without the use of a paper ticket.

Generally, NFC requires that NFC devices be present within a relatively close proximity to each other so that their corresponding magnetic fields can exchange information. Typically, a first NFC device transmits or generates a magnetic field modulated with the information, such as the credit information or the ticket fare information. This magnetic field inductively couples onto a second NFC device that is proximate to the first NFC device. The second NFC device may respond to the first NFC device by transmitting or generating its own modulated magnetic field and inductively coupling this magnetic field to the first NFC device.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION

Figure 1:
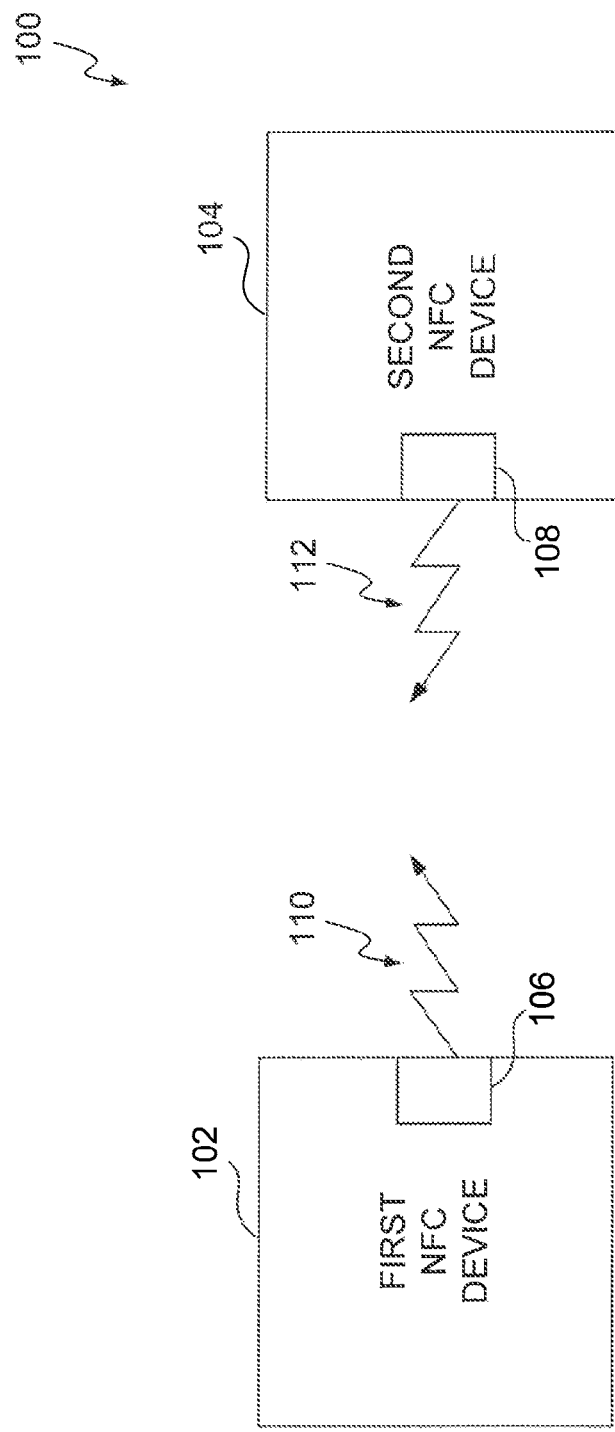
FIG. 1 shows a block diagram of an NFC environment.

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although, the description of the present invention is to be described in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

FIG. 1 illustrates a block diagram of a NFC environment 100 according to an exemplary embodiment of the invention. A NFC environment 100 provides wireless communication of information among a first NFC device 102 and a second NFC device 104 that are closely proximate to each other (typically between 0 cm and 4 cm spacing). The information may include one or more commands to be executed by the first NFC device 102 and/or the second NFC device 104, data from one or more data storage devices that is to be transferred to the first NFC device 102 and/or the second NFC device 104, or any combination thereof. The data storage devices may include one or more contactless transponders, one or more contactless tags, one or more contactless smartcards, or any other machine-readable media that will be apparent to those skilled in the relevant art(s) without departing from the spirit and scope of the invention, or any combination thereof. The other machine-readable media may include, but are not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples.

NFC devices 102 and 104 may be any of three types of devices. One type is a tag, or target. A tag is passive. A tag contains data or commands. When brought into communication with another device, the tag transfers data and/or commands to the second device. As one example, a tag may be an ID card that permits access to a building when the data stored on the tag is read. A second type is a reader, or initiator. A reader generates an electromagnetic field which is modulated by a tag. An example of a reader may be the unit mounted on the building wall that reads the information stored in the tag. The reader reads data stored on the tag and may take action based on the received information. A controller is a device that incorporates features of both a tag and a reader. A controller typically has more "intelligence" than a tag. That is, a controller may handle more computational and operational functions than a tag. A classic tag typically will only receive from and transmit data to a reader. Thus a controller may act as a tag, or a reader, or both. For purposes of the present disclosure, a tag, a reader, and a controller will be referred to herein individually and collectively as a "NFC device."

The first NFC device 102 and/or the second NFC device 104 may be implemented as a standalone or a discrete device or may be incorporated within or coupled to larger electrical devices or host devices such as mobile telephones, portable computing devices, other computing devices such as personal, laptop, tablet, or desktop computers, computer peripherals such as printers, portable audio and/or video players, television receivers, a payment system, ticket writing systems such as parking ticketing systems, bus ticketing systems, train ticketing systems or entrance ticketing systems to provide some examples, or in ticket reading systems, toys, games, posters, packaging, advertising materials, product inventory checking systems and/or any other suitable electronic device that will be apparent to those skilled in the relevant art(s) without departing from the spirit and scope of the invention.

The first NFC device 102 and/or the second NFC device 104 interact with each other to exchange information such as data and/or one or more commands to be executed by the first NFC device 102 and/or the second NFC device 104. Each NFC device 102 and 104 contains an antenna 106 and 108, respectively, to enable NFC devices 102 and 104 to communicate with each other. One example of such communications is a peer (P2P) communications mode or a reader/writer (R/W) communications mode. In the P2P communications mode, the first NFC device 102 and the second NFC device 104 may be configured to operate according to an active communications mode and/or a passive communications mode. The first NFC device 102 modulates first information onto a first carrier wave, referred to as a modulated data communication, and generates a first magnetic field by applying the modulated data communications to the first antenna 106 to provide a first data communications 110. The first NFC device 102 ceases to generate the first magnetic field after transferring the first information to the second. NFC device 104 in the active communications mode via the second antenna 108. Alternatively, in the passive communications mode, the first NFC device 102 continues to apply the first carrier wave without the first information, referred to as an unmodulated data communication, to continue to provide the first data communications 110 once the first information has been transferred to the second NFC device 104.

In a communication mode, the first NFC device 102 is sufficiently closely proximate to the second NFC device 104 that the first data communications 110 is inductively coupled onto the second antenna 108 of the second NFC device 104. The second NFC device 104 demodulates the first data communications 110 to recover the first information. The second NFC device 104 may respond to the first information by modulating second information onto a second carrier wave and generating a second magnetic field by applying this modulated data communications to the second antenna 108 to provide a second modulated data communications 112 in the active communications mode. Alternatively, the second NFC device 104 may respond to the first information by modulating the first carrier wave that is inductively coupled onto the second antenna 108 with the second information to provide the second modulated data communications 112 in the passive communications mode.

In the R/W communications mode, the first NFC device 102 is configured to operate in an initiator, or reader, mode and the second NFC device 102 is configured to operate in a target, or tag, mode. This example is not limiting. Those skilled in the relevant art(s) will recognize that the first NFC device 102 may be configured to operate in the tag mode and the second NFC device 104 may be configured to operate in the reader mode in accordance with the teachings herein without departing from the spirit and scope of the present invention. The first NFC device 102 modulates the first information onto the first carrier wave and generates the first magnetic field by applying the modulated data communications to the first antenna 106 to provide the first data communications 110. The first NFC device 102 continues to apply the first carrier wave without the first information to continue to provide the first data communications 110 once the first information has been transferred to the second NFC device 104. The first NFC device 102 is sufficiently closely proximate to the second NFC device 104 that the first data communications 110 is inductively coupled onto the second antenna 108 of the second NFC device 104.

The second NFC device 104 derives or harvests power from the first data communications 110 to recover, to process, and/or to provide a response to the first information. The second NFC device 104 demodulates the first data communications 110 to recover the first information. The second NFC device 104 processes the first information. The second NFC device 104 may respond to the first information by modulating the second information onto the second carrier wave and generating the second magnetic field by applying this modulated data communications to the second antenna 108 to provide the second modulated data communications 112.

Further operations of the first NFC device 102 and/or the second NFC device 104 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—

Interface and Protocol-2 (NFCIP-2)," published on Jan. 15, 2005, each of which is incorporated by reference herein in its entirety.

The present disclosure is directed to using the ability of an NFC device to harvest power from the field and use that power to drive circuit components. Disclosed embodiments find particular utility in situations where a host device has lost power, for example because the battery powering the host device has been drained.

Figure 2:
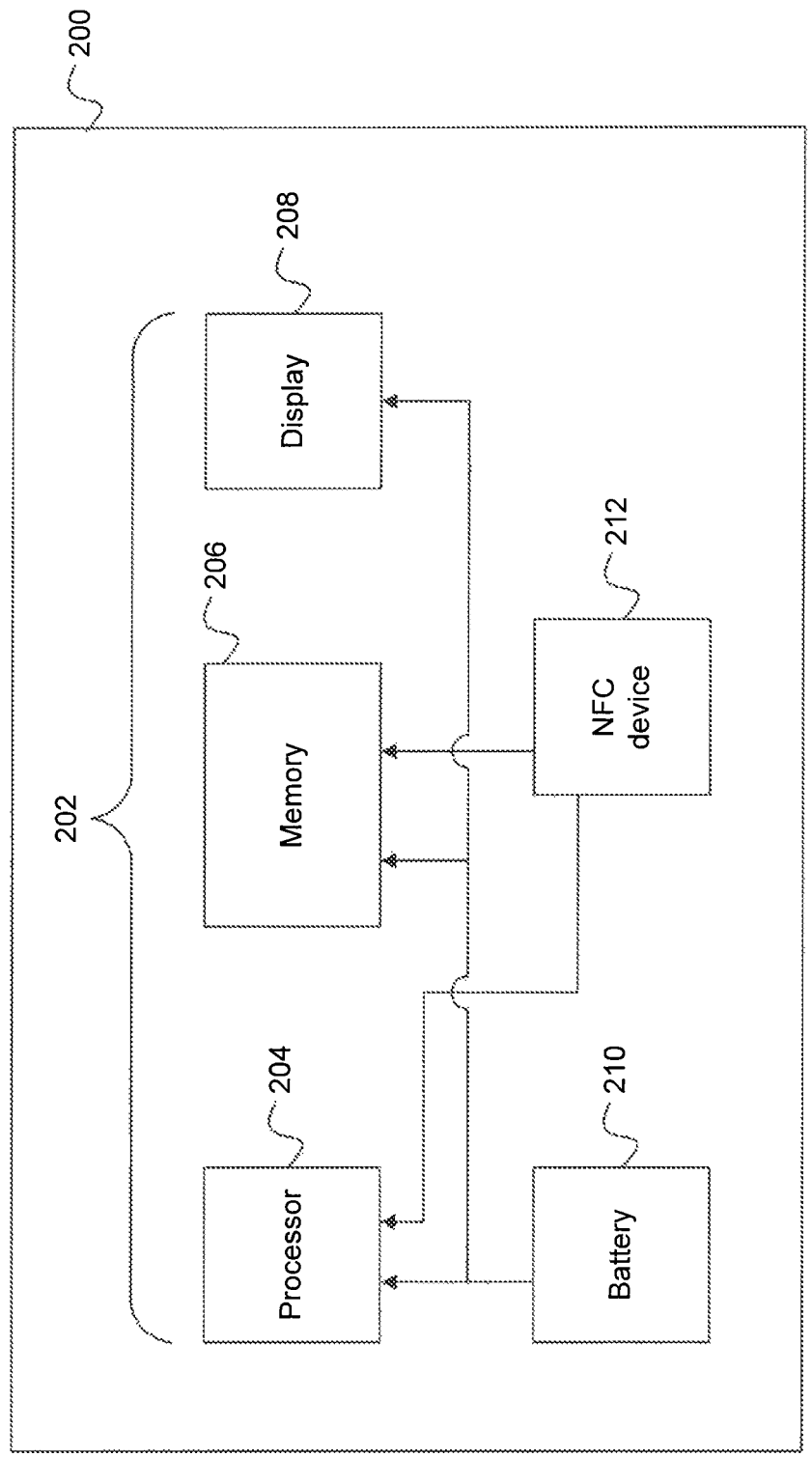
FIG. 2 shows an exemplary embodiment of the NFC communications system described herein.

FIG. 2 shows a host device 200. Host device 200 may be any number of devices, such as, but not limited to, a desktop, laptop, or tablet computer, a mobile phone, a television receiver, a video or audio recorder, or any other device capable of receiving, storing, displaying and/or transmitting data over a wireless communication link. Typically, but not exclusively, host device 200 will be a portable device, such as a mobile phone, a smartphone, or a tablet, notebook, or laptop computer. For convenience, host device 200 may be referred to herein as a smartphone, although it will be understood that this term merely exemplifies the multitude of devices that can be used in the present environment.

Host device 200 contains within it operating equipment 202, including, but not limited to one or more processors 204, memory 206, either temporary or permanent or both, a display 208, if appropriate, and any other operating equipment suitable for that host device. Host device 200 also contains an internal power supply 210, typically including one or more rechargeable or non-rechargeable batteries. Power supply 210 typically provides operating power to the several components of operating equipment 202.

Host device 200 incorporates within it a NFC device 212. NFC device 212 may be a separate component co-located on a circuit board with some or all of the operating equipment 202 components. Alternatively, NFC device may be incorporated as an integrated part of an operating component chip. For example, NFC device 212 may be part of a processor chip or a memory chip. Such design considerations are not material to the present invention and are a function of engineering factors that are outside the scope of this disclosure. NFC device 212 typically operates as a tag, but with expanded processing capabilities. NFC device 212 is operatively connected to components of operating equipment 202, including, but not limited to, one or more of processors 204 and memory 206.

Normally, operating equipment 202 is powered by power supply 210. However, it can happen that power supply 210 can become drained so that operating equipment 202 loses power and cannot operate normally. It will then be the case that secure information stored in memory 206 will be inaccessible, thereby preventing a user of host device 200 to perform certain functions. For example, suppose a user wants to be able to use a mode of transportation, such as a subway, and the user's system access information, including financial credit information, is stored in memory 206 of host device 200 (e.g., a smartphone). If power supply 210 is drained, memory 206 will be inaccessible and the uses will not be able to gain access to the subway system.

In the herein disclosed system, NFC device 212 is incorporated into host device 200. NFC device 212 is operatively connected to at least some of operating equipment 202 components, including, but not limited to, one or more processors 204 and memory 206. NFC device 212 controls which components to power on and when. Powering on, typically, but not necessarily, is accomplished serially. Typically, but not necessarily, only one component of operating equipment 202 is powered on at a time to conserve the minimum power that is available, as will be described in more detail below.

NFC device 212 also controls the functions that are performed by the powered on components. For example, if NFC device 212 powers on memory 206, NFC device 212 may instruct memory 206 to upload and/or download data to NFC device 212 or to another component part of operating equipment 202. Similarly, if NFC device 212 powers on processor 204, NFC device 212 may instruct processor 204 as to what operations to perform. It may be necessary for the operating components to inform NFC device 212 when they have completed their task, so that NFC device 212 will know to power that or those components off Additionally, or alternatively, NFC device 212 may turn a component on for a predetermined period of time. For example, if NFC device 212 knows that it takes a specific number of microseconds to transfer data to or from memory 206, NFC device 212 may power on memory 206 for that length of time.

Algorithms in NFC device 212 control which component(s) to power on. The algorithms operate on data obtained by NFC device 212 from a reader (not shown) or from the operating components in host device 202.

Figure 3A:
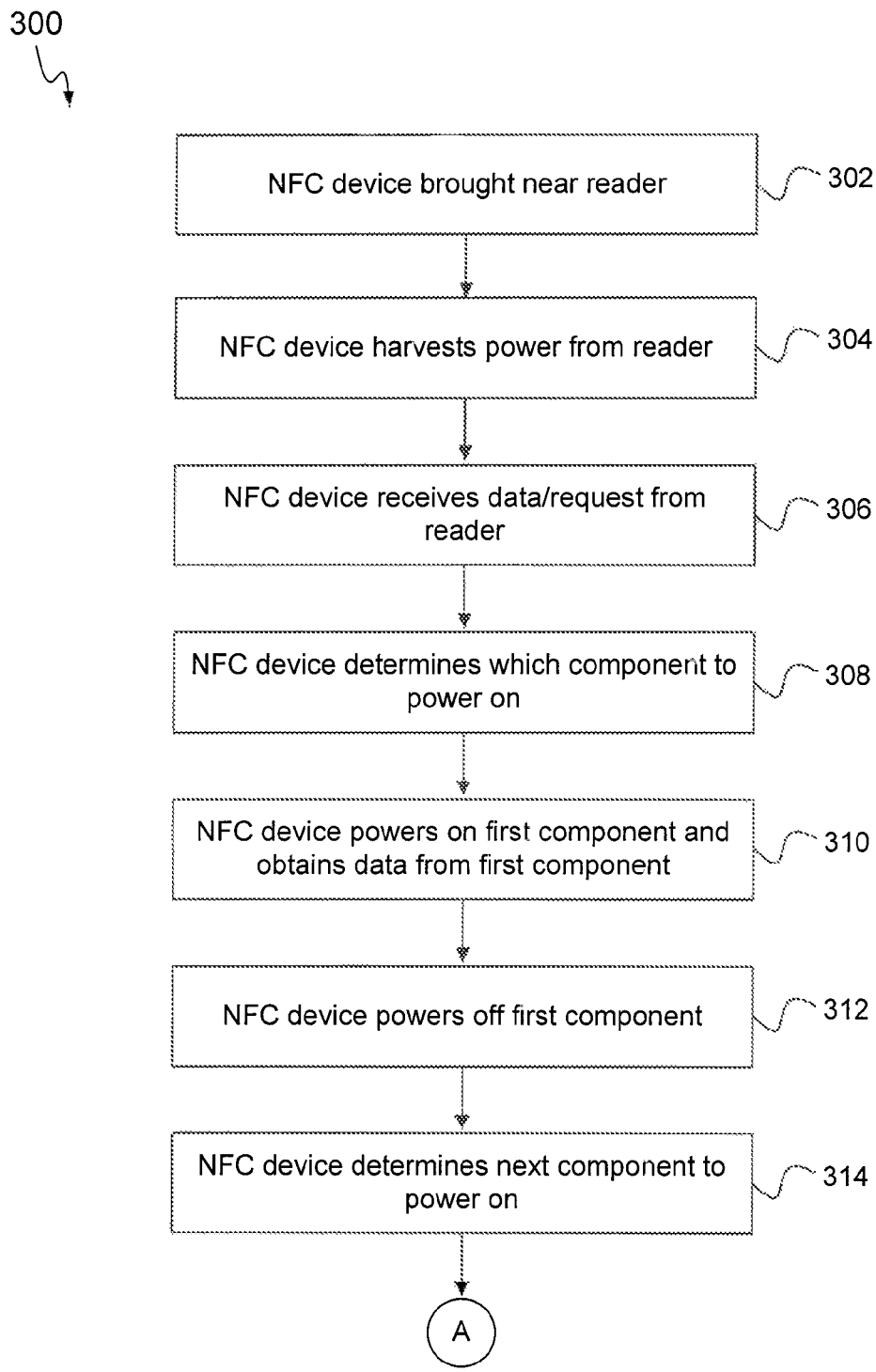
FIG. 3A and FIG. 3B illustrate a flow chart that shows the operation of an embodiment of the NFC communications system described herein.
Figure 3B:
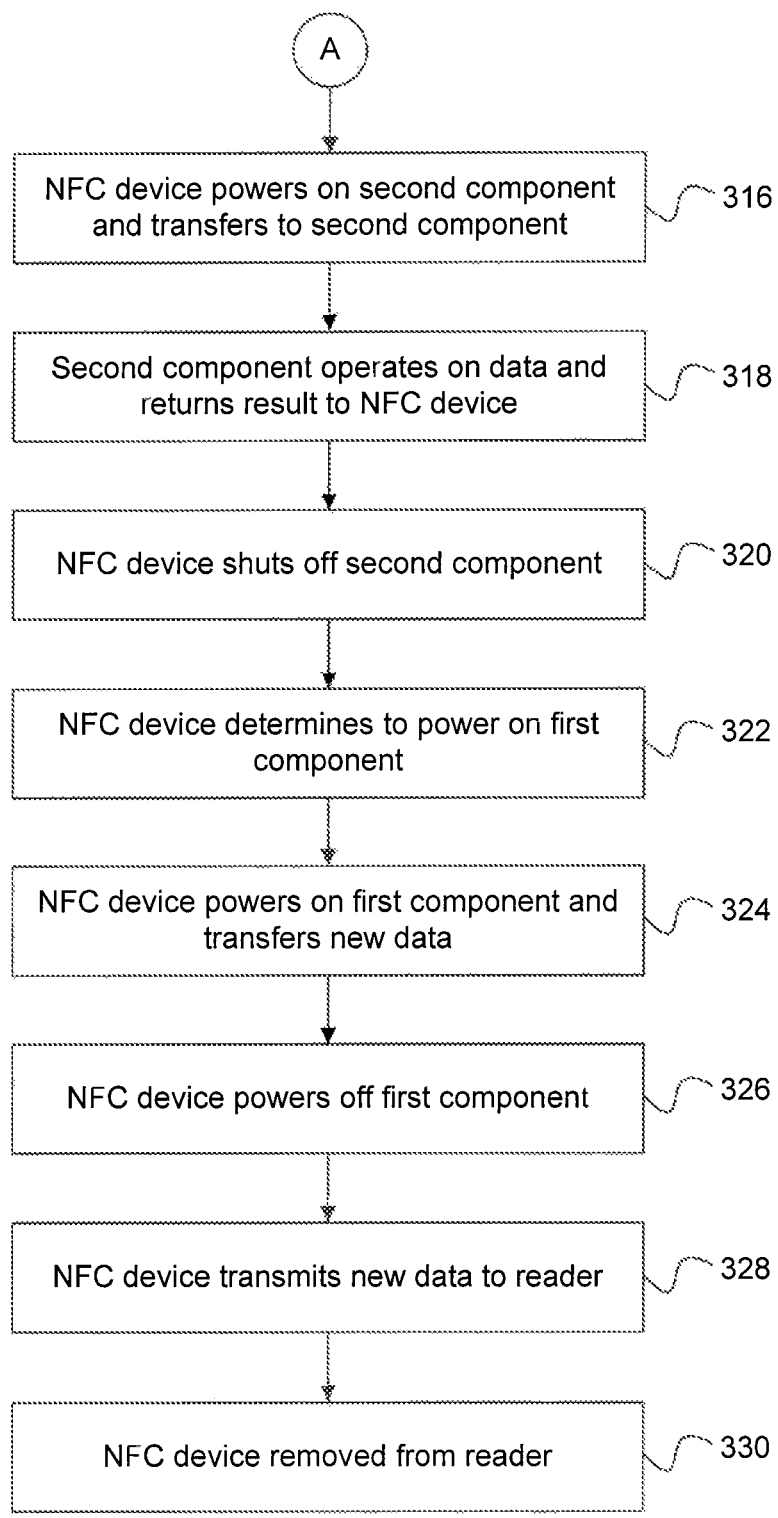

FIG. 3 is flowchart of operations 300 of one embodiment of the system described herein. At step 302, NFC device 212 is brought close to a reader (not shown). At step 304, NFC device 212 harvests power from the reader. The power that is harvested from the magnetic field generated by the reader and converted to electrical energy by NFC device 212 is quite minimal. It is typically sufficient to only power on one chip component at a time. At step 306, the reader transfers data or a request for data to NFC device 212. In the example used here, the reader is associated with a subway turnstile. NFC device 212 is incorporated in a smartphone or similar battery powered device that is typically used to gain access to the subway system and allow the user to pass through the turnstile to enter and/or exit the subway system. The reader typically requests information about the user's credit, namely the amount of credit stored in the smartphone that is used to pay for subway fares. In other scenarios, the reader may request information about the user's identity stored in the smartphone At step 308, NFC device 212 determines which component of operating equipment 202 should be powered on. NFC device 212 bases this determination on the type of data or request received from the reader. At step 310, NFC device 212 powers on the selected component. For example, NFC device 212 may power on memory 206 if the information received from the reader includes a request to tender the proper subway fare. In that case, NFC device 212 powers on memory 206 to obtain data including the available credit balance in the user's fare account.

At step 312, after obtaining the necessary data (e.g., the available credit balance) from the first component (e.g., memory 206), NFC device 212 powers off the first component (e.g., memory 206). At step 314, based on the data received by it from the first component, NFC device 212 may determine whether further action is required (for example, that a specific fare amount should be deducted from the user's fare account). If so, at step 316, NFC device 212 will then power on a second component (e.g., processor 204) and transfer the data (e.g., fare data) to the second component (e.g., processor 204) so that the second component can perform whatever actions are necessary to be taken by it (e.g, deducting the fare from the user's account).

At step 318, the second component (e.g., processor 204) acts on the data transferred to it (e.g, deducts the appropriate fare from the user's account) and returns the updated data (e.g., the fare amount and the reduced credit balance) to NFC device 212. At step 320, NFC device 212 shuts off power to the second component (e.g., processor 204).

At step 322, based on the updated data received from the second component, NFC device 212 determines whether to power on any other devices. In the present example, NFC device 212 powers on the first component again (e.g., memory 206). At step 324, NFC device powers on the first component and transfers the updated data (e.g., the reduced credit balance data) to the first component (e.g., memory 206).

At step 326, after transferring the updated data to the first component, NFC device 212 shuts off power to the first component. At step 328, NFC device 212 transfers the fare data to the reader. Step 328 may occur at the same time as step 324 or step 326, or following one or both of these steps. At step 330, NFC device 212 moves away from the reader and shuts off.

A variation of the process described above is shown in the flowchart 400 of FIG. 4. At step 402, NFC device 212 is brought close to the reader. At step 404, NFC device 212 harvests power from the reader. The power that is harvested from the magnetic field generated by the reader and converted to electrical energy by NFC device 212 is quite minimal. At step 406, NFC device 212 receives data and/or a request for data from the reader. Using the same example as above, the reader is associated with a subway turnstile. The data transferred from the reader to NFC device 212 is a request for host device 202 to provide the proper fare information to the reader.

At step 408, NFC device 212 determines which component(s) to power on. At step 410, NFC device 212 powers on first and second components. These components can be a processor 204 and a memory 206 in the present example. At step 412, the first component (e.g., memory 206) transfers data, (e.g., including the available credit balance in the user's fare account), to the second component (e.g., processor 204). At step 414, NFC device 212 powers off the first component (e.g., memory 206). At step 416, the second component (e.g., processor 204) operates on the transferred data and returns a result to NFC device 212.

At step 418, NFC device 212 shuts off the second component. At step 420, NFC device 212 may turn on the first component (e.g., memory 206) to upload the updated data back into the first component. This would occur where processor 204 has withdrawn the necessary fare amount from the available fare credit data and has returned the updated credit data and the fare amount data to NFC device 212. NFC device would then upload the reduced fare credit data back into memory 206 for use the next time the fare credit is needed. At step 422, NFC device 212 shuts off the first component (e.g., memory 206) when the data upload is completed.

At step 424, NFC device 212 transfers the new data (e.g., the proper fare amount) to the reader. In the example given, when this occurs, the reader will allow the subway turnstile to open and permit the user to pass through to gain access to the subway system. Finally, at step 426, NFC device 212 moves away from the reader (out of range of the reader's field) and shuts off.

Figure 4A:
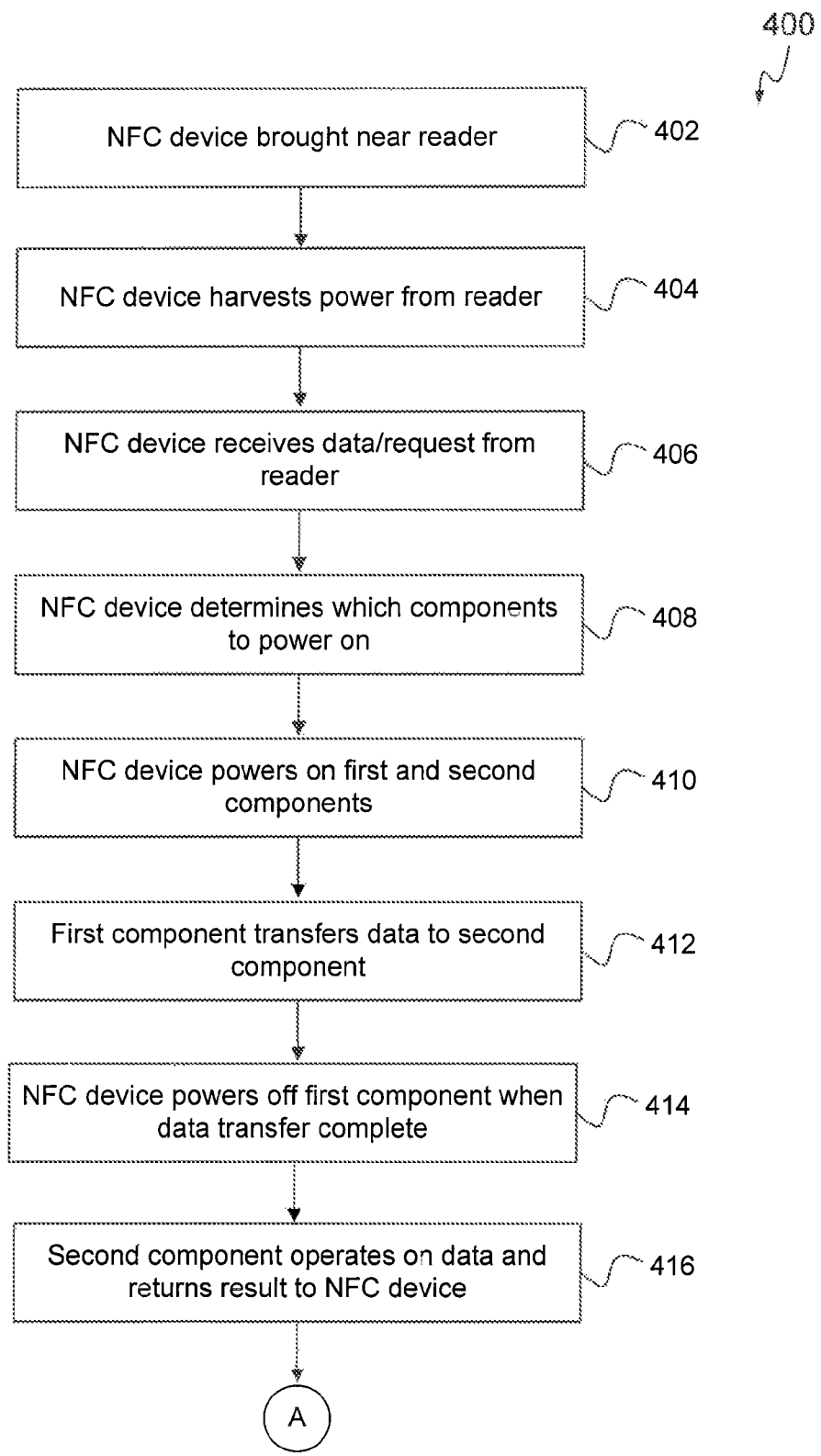
FIG. 4A and 4B illustrate another flow chart showing the operation of an embodiment of the NFC communications system described herein.
Figure 4B:
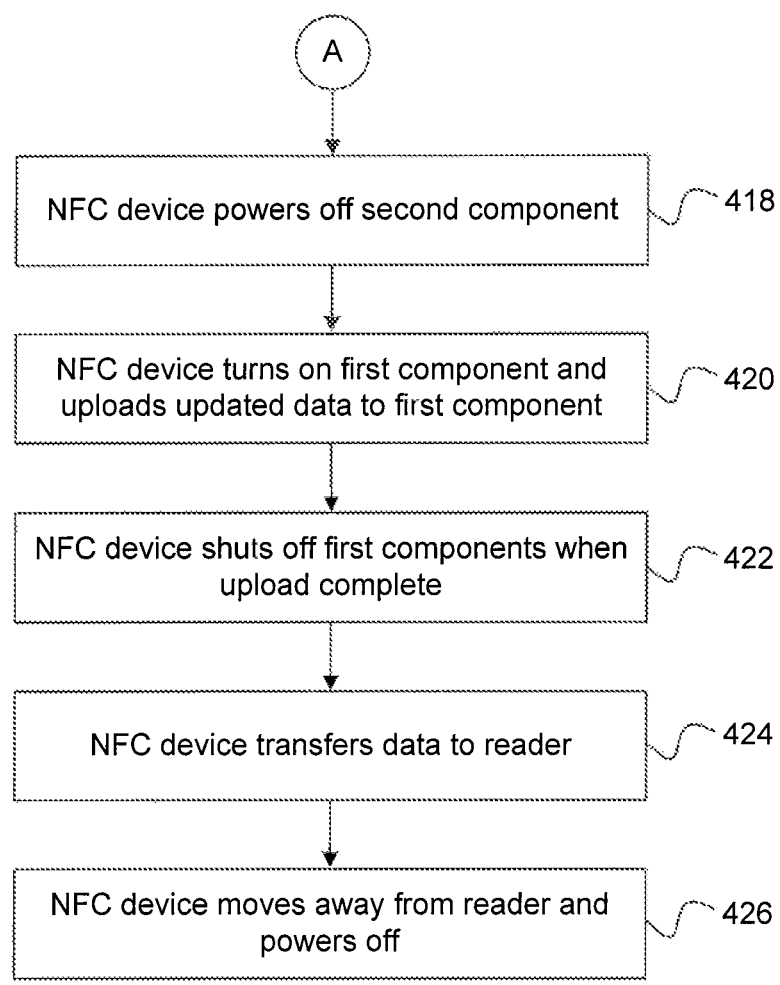

In the embodiment shown in FIG. 4, NFC device 212 turns on two components at the same time to allow data to be transferred directly between them. This is distinguished from the embodiment of FIG. 3, where only one component is turned on at a time and all data passes through NFC device 212.

In the embodiments described above, NFC device 212 acts as a tag, with increased intelligence compared to a standard tag. NFC device 212 has the ability to receive and transmit data, to perform power up and down operations based on the type and value of data it receives, and other functions necessary allow the smartphone to operate at least on a limited basis when battery power has been depleted.

Embodiments have been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. An apparatus for harvesting and using power in a near field communications (NFC) mode, comprising:
   a host device;
   an operating component contained in the host device, the operating component comprising at least one of: a processor, a memory, or a display; and
   a first NFC device in the host device configured:
      to be selectively coupled to the operating component to harvest energy from a second NFC device,
      to convert the harvested energy to electrical power,
      to selectively power on the operating component as a function of data received from the second NFC device,
      to transfer data to or from the operating component when the operating component is powered on, and
      to selectively power off the operating component when the transfer of the data between the first NFC device and the operating component has been completed.

2. The apparatus of claim 1, wherein the first NFC device is further configured to transfer the data from the operating component to the second NFC device when the first NFC device is in communication with the second NFC device.

3. The apparatus of claim 1, further comprising:
   a plurality of second operating components contained in the host device, wherein the first NFC device is configured:
      to be selectively serially coupled to the plurality of second operating components,
      to power on a first operating component from among the plurality of second operating components as a function of the information received from the second NFC device,
      to receive first data from the first operating component when the first operating component is powered on,
      to power off the first operating component when the first data transfer has been completed, to power on a second operating component from among the plurality of second operating components after the first operating component is powered off, and to transfer the first data to the second operating component, wherein the second operating component is configured to operate on the first data and to return second data to the first NFC device, and wherein the first NFC device is further configured to power off the second operating component after the second data has been returned to the first NFC device and to transfer the second data to the second NFC device.

4. The apparatus of claim 3, wherein the first NFC device is further configured to power on the second operating component as a function of the first data.

5. An apparatus for harvesting and using power in a near field communications (NFC) mode, comprising:

a host device;

plurality of operating components contained in the host device; and a first NFC device in the host device configured:

to be selectively coupled to the plurality of operating components to harvest energy from a second NFC device, to convert the harvested energy to electrical power, to be selectively serially coupled to the plurality of operating components, to power on a first operating component from among the plurality of operating components as a function of the information received from the second NFC device, to receive first data from the first operating component when the first operating component is powered on, and to power off the first operating component, when the first data transfer has been completed, to power on a second operating component from among the plurality of operating components after the first operating component is powered off, and to transfer the first data to the second operating component, wherein the second operating component is configured to operate on the first data and to return second data to the first NFC device, wherein the first NFC device is further configured to power off the second operating component after the second data has been returned to the first NFC device, to transfer the second data to the second NFC device, and to power on the second operating component as a function of the first data, wherein the second operating component is further configured to transfer third data to the first NFC device concurrently with the transfer of the second data, and wherein the first NFC device is further configured to power on the first operating Component, to transfer the third data to the first operating component, and to power off the first operating component upon completion of the transfer to the first operating component of the third data.

6. The apparatus of claim 5, wherein the first NFC device is further configured to be placed in close proximity to the second NFC device to harvest the energy from the second NFC device.

7. The apparatus of claim 6, wherein the first NFC device is further configured to be powered off when removed from close proximity to the second NFC device.

8. The apparatus of claim 1, wherein the first NFC device is configured to power on the operating component only for a predetermined period of time.

9. A method of harvesting and using power in a near field communication (NFC) mode, comprising:

harvesting energy by a first NFC device in proximity to a second NFC device;

converting the harvested energy to electrical power;

selectively powering on an operating component coupled to the first NFC device using the converted electrical power as a function of data received from the second NFC device, the operating component comprising at least one of: a processor, a memory, or a display;

transferring data to or from the operating component when the operating component is powered on; and selectively powering off the operating component by the first NFC device when the transfer of the data between the NFC device and the operating component has been completed.

10. The method of claim 9, further comprising:

transferring data received at the first NFC device from the operating component to the second NFC device when the first NFC device is in communication with the second NFC device.

11. The method of claim 9, wherein the first NFC device is incorporated in the host device, further comprising:

selectively serially coupling the first NFC device to a plurality of operating components incorporated in the host device;

powering on a first operating component from among the plurality of operating components by the first NFC device as a function of the information received from the second NFC device;

receiving first data at the first NFC device from the first operating component when the first operating component is powered on;

powering off the first operating component by the first NFC device when the first data transfer has been completed;

powering on a second operating component from among the plurality of operating components by the first NFC device after the first operating component is powered off;

transferring the first data from the first NFC device to the second operating component;

operating on the first data at the second operating component to obtain second data;

returning the second data to the first NFC device from the second operating component;

powering off the second operating component by the first NFC device after the second data has been returned to the first NFC device; and transferring the second data from the first NFC device to the second NFC device.

12. The method of claim 11, further comprising:

powering on the second operating component by the first NFC device as a function of the first data.

13. The method of claim 12, further comprising:

transferring third data to the first NFC device from the second operating component concurrently with the transfer of the second data;

powering on the first operating component by the first NFC device as a function of the third data received by the first NFC device;

transferring the third data from the first NFC device to the first operating component; and powering off the first operating component by the first NFC device upon completion of the transfer of the third data to the first operating component.

14. The method of claim 13, further comprising:

placing the first NFC device in close proximity to the second NFC device to harvest the energy from the second NFC device.

15. The method of claim 14, further comprising:

powering off the first NFC device when the first NFC device is removed from close proximity to the second NFC device.

16. The method of claim 9, further comprising:

powering on the operating component by the first NFC device only for a predetermined period of time.

17. The apparatus of claim 5, wherein the first NFC device is configured to power on the operating component only for a predetermined period of time.

18. The method of claim 13, further comprising:

powering on the operating component by the first NFC device only for a predetermined period of time.

* * * * *

UNITED STATES PATENT AND TRADEMARK OFFICE
CERTIFICATE OF CORRECTION

PATENT NO.          : 8,620,218 B2                                               Page 1 of 1
APPLICATION NO.     : 13/172335
DATED               : December 31, 2013
INVENTOR(S)         : Mohamed Awad It is certified that error appears in the above-identified patent and that said Letters Patent is hereby corrected as shown below:

In the Claims

Column 9, line 19, please replace "plurality of operating components" with --a plurality of operating components--.

Column 9, line 34, please replace "operating component, when" with --operating component when--.

Column 9, line 54, please replace "first operating Component" with --first operating component--.

Signed and Sealed this
Eleventh Day of March, 2014

Michelle K. Lee
*Deputy Director of the United States Patent and Trademark Office*